(12) United States Patent
Rupaner et al.

(10) Patent No.: US 6,458,230 B1
(45) Date of Patent: *Oct. 1, 2002

(54) PREPARATION OF RECYCLABLE FIBER COMPOSITES

(75) Inventors: Robert Rupaner, Ludwigshafen; Karl-Heinz Schumacher; Werner Kirchner, both of Neustadt; Bradley Ronald Morrison, Mannheim; Roland Offner, Dettenheim; Hermann Seyffer, Heidelberg, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/711,883

(22) Filed: Sep. 12, 1996

(30) Foreign Application Priority Data

Sep. 26, 1995 (DE) .......................................... 195 35 792

(51) Int. Cl.⁷ ................................................. B32B 31/00
(52) U.S. Cl. ........................ 156/155; 156/94; 521/40.5; 524/564; 525/328.2; 525/330.2; 528/489
(58) Field of Search ................ 156/155, 94; 525/330.2, 525/328.2; 521/40.5; 528/489; 524/564

(56) References Cited

U.S. PATENT DOCUMENTS 2,244,703 A * 6/1941 Hubbuch ................. 525/330.2
2,607,714 A * 8/1952 Smucker ..................... 156/155
4,278,727 A   7/1981 Brabetz et al.
4,990,146 A * 2/1991 Deibig et al. ................ 526/332
5,336,755 A * 8/1994 Pape .......................... 521/40.5
5,466,411 A   11/1995 Butterfass et al.

FOREIGN PATENT DOCUMENTS

DE         27 47 182        4/1979
EP         0 624 620        11/1994

* cited by examiner

Primary Examiner—John J. Gallagher
(74) Attorney, Agent, or Firm—Oblon, Spivak, McClelland, Maier & Neustadt, P.C.

(57) ABSTRACT

A process for preparing recyclable fiber composites, comprising bonding fibers with a polymeric bonding agent applied as an aqueous polymer dispersion to said fibers, the polymeric bonding agent comprising at least one addition polymer which, in the state of an aqueous dispersion, has a film forming capability at the temperature at which the addition polymer is combined with said fibers, and said aqueous polymer dispersion, when subjected to a change in pH, is converted into an aqueous solution of the addition polymer.

The aqueous addition polymer of the addition polymer dispersion can contain protic acid groups, and the state of the dispersion can be converted to an aqueous addition polymer solution by raising the pH of the aqueous medium. Alternatively, the addition polymer may contain basic groups, in particular, amino groups, and its state as a dispersion can be converted into an aqueous addition polymer resolution by lowering the pH of the aqueous medium.

24 Claims, No Drawings

PREPARATION OF RECYCLABLE FIBER COMPOSITES

This invention relates to a process for preparing recyclable fiber composites by bonding the fibers together by means of a polymeric bonding agent.

A significant obstacle to the universal recycling of industrial goods is the nonunitary nature of their materials of construction. Moldings or composites coated with paint or plastic where the components are difficult to separate present a particular problem. Frequently, these materials are difficult or impossible to recycle and therefore have to be disposed of in a costly manner. The material re-use of post-use goods or off-cuts from the manufacture of consumer goods is very attractive for processors. Consequently, the substantial conversion of post-use parts with various compositions into new parts of the same type has not only appreciable economic but also environmental significance.

To enhance their resistance to mechanical stress, fibrous structures are consolidated with bonding agents to form fiber composites. These bonding agents, also known as bonders or binders, may take the form of, for example, dispersions and be used in that form. The enhanced strength results from the bonding-together of the fibers by the filming (film-forming) polymers which adhere to the fiber and thus reinforce the fibrous structure. In numerous applications, this polymer film has to be sufficiently stable to contact with water in order that the gross fiber-bonder assembly or composite may have adequate mechanical strength in the wet state, too.

Of interest from a recycling point of view are for example the stamping or cutting wastes from the formating of bonder-consolidated nonwoven articles, the fiber and also bonder fraction of which are lost for the further production process. Examples are wastes from the manufacture of interlinings for textile applications, diapers or sanitary protection articles. Products of this kind are soft and flexible. A further concern is the recycling of consumer goods such as the interior trim of motor vehicles, wheel arch trim, parcel shelves and other, comparable parts comprising loadbearing articles comprising binder-containing, pressed materials. Products of this kind are rigid, molded, inflexible and generally thermoplastically (de)formable. A further concern is the recycling and also re-use of textile floor coverings, carpet materials or fitted carpets and carpet tiles. These sheetlike materials usually consist of needled or bonder-consolidated fibrous materials with a foam backing containing a high proportion of filler-containing foamed latex. Products of this kind are less flexible, but not rigid.

The parts in question here are fiber composites in which the fibers are bonded with thermosetting or thermoplastic binders and densified and consolidated by means of pressure and heat. The mechanical separation of such a fiber composite would inescapably lead to a destruction of the fiber itself or of the bonding agent polymer, so that the recovered material could not be used to fabricate a new part having equivalent production and structural component properties.

Such fiber composites are in particular nonwovens (see Ullmann's Enc. d. techn. Chem.), in particular in the form of thermoformable needle-felt carpets, as used for example in the automotive industry. It is known to recycle such nonwovens by dissolving the polymeric binder out of the nonwoven and recovering the fiber web obtained (DE-A-43 15 875). The disadvantage of this process is the disposing of the binder solution. EP-A-0 576 128 discloses dispersion mixtures in particular for adhesives which are suitable for repulping without tackiness. These mixtures can also be used for adhering nonwoven textiles. When used for impregnating nonwovens, the latter lack wet strength and disintegrate on contact with neutral water. EP-A-0 538 625 discloses textile floorcoverings produced by needling a backing layer onto a raw state material and impregnating the backing layer with a latex dispersion. This dispersion can be dissolved out of the floor covering with the aid of a solvent. However, industrially practical recycling of the floor coverings is not possible as a result. U.S. Pat. No. 3,843,321 describes a process for recovering fibers from nonwovens by treating the latter with an aqueous solution of an alkali metal hydroxide and an organic solvent at elevated temperature. It is true that the fibers are hardly damaged, but the bonding agent polymer is completely destroyed. EP-B-0 518 004 discloses a recycling process for glass matt reinforced thermoplastics wherein the material is comminuted and pulverized. The powder is used in mixture with a resin as hardener as bonding agent for textile fibers or textile web. EP-A-0 547 533 discloses using recyclable components in the manufacture of a textile floor covering. Possible recycling operations mentioned are comminuting, melting and renewed extrusion or depolymerization. Finally, EP-A-0 316 676 discloses a dissoluble adhesive film where the dissolved copolymer is obtained by acidification in small lumps or clumps which are separated from the aqueous system by a simple mechanical separating operation.

It is an object of the present invention to provide bonding agents which meet the otherwise required properties, but are easily and completely removable from the fibers and thereafter re-usable, so that not only the fibers but also the bonding agents themselves can be recycled into the original production process.

We have found that this object is achieved according to this invention on using a bonding agent comprising an aqueous addition polymer dispersion comprising, in a state of dispersion, an addition polymer fraction which films at use temperature with the proviso that the total amount of the addition polymer fraction of the aqueous addition polymer dispersion which films at use temperature and is present in the aqueous addition polymer dispersion in a state of dispersion is converted into an aqueous addition polymer solution when the pH of the aqueous dispersing medium is changed. In an embodiment of the process of this invention, the aqueous addition polymer dispersion's addition polymer fraction which films ad use temperature has protic acid groups and its state of dispersion in the aqueous medium is converted into an aqueous addition polymer solution by raising the pH of the aqueous medium. In another embodiment of the process of this invention, the aqueous addition polymer dispersion's addition polymer fraction which films at use temperature has (basic groups, in particular amino groups, and its state of dispersion in the aqueous medium is converted into an aqueous addition polymer solution by lowering the pH of the aqueous medium. In a specific embodiment of this invention, the fraction which films at use temperature is free-radically polymerized from the following:

A) from 50 to 99% by weight of one or more monomers A selected from the group comprising (meth)acrylic esters, vinyl esters, aromatic vinyl compounds, vinyl ethers, ethylenically unsaturated nitrites, olefinic hydrocarbons; and B) from 1 to 50% by weight of one or more water-soluble monomers B selected from the group comprising ethylenically unsaturated carboxylic acids, organic ethylenically unsaturated sulfonic acids, organic ethylenically unsaturated carboxamides, N-methylol compounds of ethylenically unsaturated carboxamides and hydroxyalkyl (meth)acrylates.

The filming addition polymer fraction is prepared in the presence of from 0.01 to 10% by weight, based on A+B, of a substance which regulates the free-radical polymerization reaction.

This invention accordingly employs as bonding agents aqueous addition polymer dispersions whose films are soluble either in an alkaline aqueous medium (in the case of dispersion addition polymers containing protic acids as copolymerized units) or in an acidic aqueous medium (in the case of dispersion addition polymers containing basic compounds, for ex ample amines, as copolymerized units) and make it possible to regenerate the bonding agent dispersion by reversing the adjustment of the pH of the resulting aqueous bonding agent solution with or without the action of concentrating measures, making the bonding agent recyclable as well as the fibers, so that the problem of disposing of the bonding agent solution no longer arises.

The bonding agent addition polymers whose polymer composition includes a minimum fraction of acidic monomers were obtained using a polymerization regulator. As a result, the bonding agents can be completely dissolved in an aqueous environment at above pH 9 and the fiber composite then separates into fibers and a bonding agent solution, from which the fibers are readily filtered off and recycled into the production cycle. The basic bonding agent solution can be re-used as solution, readjusted to the original pH or else preferably added directly to new binder in order that the latter may be diluted to a certain liquor concentration or adjusted to a certain liquor pH. A lowering of the pH is normally followed by a renewed dispersing of the addition polymer, ie. by a redispersing to form a dispersion. This redispersing can be promoted by adding further surfactant.

The addition polymers of this invention have, when used as constituent of the fiber composites, a high dissolution capacity which makes possible complete removal of the bonding agent addition polymer from the fiber surface to recover ideally single-product fiber materials. It was found that a high proportion of copolymerized acid in the bonding agent addition polymer enhances the dispersibility In this connection, the bonding agents of this invention frequently have, even without the use of crosslinking monomers, for example the addition products of formaldehyde with acrylamide or methacrylamide, high wet strengths, despite the common prior art view that the wet strength suffers with the high proportion of hydrophilic monomers required in the addition polymers to render the bonder dispersible and that the bonded products would consequently be vulnerable to water or wetness. The wet strength of the composites can be further enhanced by using hydrophobicizing agents, since they counteract the wettability by aqueous systems. The necessary wet strength must generally be more than 10 N/50 mm, preferably above 20 N/50 mm, when the strip width of the samples is 50 mm. A high wet strength is required for example of (paper) napkins, sanitary protection towels, liners, etc., which can become moist or wet in parts during use. Similarly, nonwoven interlinings for garments which are to be washed or dry cleaned are subjected to mechanical stress during the washing process.

If the bonding agent used according to this invention also contains a nonfilming addition polymer fraction which moreover is not transformable into an aqueous solution, this fraction can either remain on the fiber surface or, after drying of the removed fiber, be removed by mechanical action, for example beating.

The omission of the crosslinking N-methylol compounds, moreover, leads to a nonpresence of formaldehyde and constitutes the preferred embodiment. However, it is of course also possible to include small amounts of self-crosslinkable monomers. Customarily, in such a case, not more than 1% of said N-methylol derivatives is used, preferably none. A high proportion of copolymerized acid or crosslinkers increases the hand or harshness of the end material. An additional lowering of the molecular weight by regulating the addition polymers augments the process of dispersion and reduces the harshness, but also unfortunately diminishes the wet strength. Enhanced wet strength coupled with good dispersibility and high softness of the nonwovens is consequently obtained when the polymerization reaction is regulated only slightly.

The addition polymers preferred according to this invention for use as bonding agents will now be described.

Monomers A account for preferably from 50 to 99% by weight, preferably from 60 to 97% by weight, very particularly preferably from 70 to 90% by weight, of the total amount of the monomers and are selected from:

a1) Esters of acrylic and methacrylic acid, of which the acrylic esters are preferred.

a2) Ethylenically unsaturated nitriles such as acrylo-nitrile and methacrylonitrile, of which acrylo-nitrile is preferred.

a3) Vinyl esters, of which vinyl acetate, vinyl propionate, vinyl esters of α-branched monocarboxylic acids, for example VeoVa9© or VeoVa10©, and also vinylformamide are preferred.

a4) Aromatic vinyl monomers such as styrene and divinylbenzene, of which styrene is very particularly preferred.

a5) Unsaturated $C_4$–$C_8$-dienes such as ethylene, propylene, butadiene, vinylidene chloride and vinyl chloride, of which butadiene is particularly suitable.

a6) Vinyl ethers such as vinyl methyl ether, vinyl ethyl ether and diethylene glycol monomethyl vinyl ether.

Monomers B account for preferably from 1 to 50% by weight, especially from 2 to 40% by weight, particularly preferably from 5 to 30% by weight of the total amount of the monomers and are selected from those monomers which have a molar solubility in water of not more than 0.1 mol/l at 25° C.:

b1) Ethylenically unsaturated carboxylic acids or anhydrides and also sulfonic and phosphonic acids such as acrylic acid, methacrylic acid, (meth)acrylamidoglycolic acid and esters and/or ether derivatives thereof, itaconic acid, vinylphosphonic acid, vinylsulfonic acid, maleic anhydride and methacrylic anhydride, acrylamido-2-methylpropanesulfonic acid. Very particular preference is given to methacrylic acid, acrylic acid, itaconic acid and acrylamidoglycolic acid.

b2) Ethylenically unsaturated amides and derivatives thereof. Particularly suitable and preferred are acrylamide, methacrylamide and also alkyl acrylamidoglycolates and/or alkyl ethers thereof. The N-methylol derivatives of acrylamide and methacrylamide are used at below 1% by weight, but preferably they are not used at all.

b3) Of the hydroxyalkyl esters of acrylic and methacrylic acids, 2-hydroxyethyl acrylate, 2- and 3-hydroxypropyl acrylates, 4-hydroxybutyl acrylate, 2-hydroxyethyl methacrylate, 3-hydroxypropyl methacrylate and also reaction products of mono- and disaccharides with acrylic acid or methacrylic acid are preferred. Very particular preference, however, is given to using hydroxyethyl acrylate.

b4) Hydrophilic monomers such as acrylonitrile, acrolein, methyl vinyl ketone, vinyl acetate, methyl acrylate, ethyl acrylate, vinyl propionate are likewise suitable and preferred for raising the hydrophilicity of the addition polymers.

Said monomers b1) may in part also be used in neutralized form or, after the polymerization has taken place, be partially neutralized so that the pH of the binder dispersion is between 1 and 7.

Suitable neutralizing agents include not only ammonia and other amines such as ethanolamine or triethanolamine but also basic salts of alkali metals, alkaline earth metals or else other metals, for example sodium hydroxide solution, sodium bicarbonate, calcium hydroxide, zinc oxide, magnesium oxide or sodium pyrophosphate. The addition of such substances to the electrolyte-stable dispersions of this invention has a buffering effect and enhances the colloidal stability of the dispersions during their preparation, transportation or processing. Bivalent metal ions or diamines enhance the cohesion of the addition polymers, but greatly reduce the water resistance.

The monomers of groups a1 to a6 and also b1 to b4 can each be used alone or in any desired mixtures. Particularly suitable for use as monomer mixture A are combinations of monomers of a1) with a2), a3) and a4) ("meth-acrylic acid copolymers"), in which case a1 preferably accounts for at least 50% by weight of mixture A, or a combination of a3) with a1), a4), a5) and a6) ("vinyl ester copolymers"), in which case a3 preferably accounts for at least 30% by weight of mixture A.

A skillful combination with monomers B, which generally have a high solubility parameter β, will raise the overall solubility parameter of the addition polymer and lead to increased resistance to organic solvents. The results are bonding agents which are resistant to dry cleaning even without the use of N-methylol compounds.

The monomers are preferably combined so that the resulting addition polymer has a glass transition temperature of from −50 to +130° C., preferably from 40 to +80° C., very particularly preferably from −30 to +60° C., the glass transition temperatures being determined by DSC measurement. To an approximation, the glass transition temperature can also be calculated by the method of T. G. Fox (Bull. Am. Soc., Ser. II, 1 (1956) 123) from the glass transition temperature of the homopolymers, which are tabulated in the usual reference works. Variation of the glass transition temperature allows the preparation of products for different uses. If thermoformable needlefelt floorcoverings are to be prepared, mixtures of hard and soft dispersion addition polymers or stepwise sequences of hard and soft addition polymers are preferred.

Preferred embodiments of the bonding agents prepared according to this invention are:

I) from 60 to 85% by weight of n-butyl acrylate or ethyl acrylate, from 5 to 20% by weight of acrylo-nitrile or methyl methacrylate or styrene and from 10 to 20% by weight of methacrylic acid or acrylic acid.

II) from 50 to 80% by weight of n-butyl acrylate, from 10 to 50% by weight of vinyl acetate or vinyl propionate and from 1 to 30% by weight of methacrylic acid or acrylic acid.

III) from 30 to 50% by weight of n-butyl acrylate, from 30 to 50% by weight of ethyl acrylate and from 5 to 30% by weight of methacrylic acid or acrylic acid.

IV) from 40 to 80% by weight of methyl methacrylate, from 10 to 30% by weight of n-butyl acrylate or ethylhexyl acrylate, from 10 to 20% by weight of styrene and from 5 to 30% by weight of methacrylic acid or acrylic acid.

V) from 50 to 80% by weight of butadiene, from 10 to 30% by weight of styrene and/or acrylonitrile, from 5 to 30% by weight of methacrylic acid.

Suitable polymerization regulators for the free-radical polymerization include all customary types of regulators. Specific examples are:

r1) Linear or branched, aliphatic or else aromatic mono- or polythiols which may optionally contain further, hydrophilicizing groups, of which tert-dodecyl mercaptan, tris(methoxy)silylpropanethiol (MTMO) and thioethanol are preferred.

r2) Other sulfur compounds such as disulfides or xanthates, cysteine and cysteine esters.

r3) Thioglycolic acid and its derivatives such as the ammonium or alkali metal salts or its esters, such as the ethyl ester, 2-ethylhexyl ester, allyl ester or benzyl ester. Particular preference is given to the 2-ethylhexyl ester of thioglycolic acid.

r4) Halogen compounds such as bromotrichloromethane, tetrabromomethane or tetrachloromethane or other bromine-containing derivatives of ethane, of propane or of butane. Preference is given to using bromotrichloromethane.

r5) Allyl compounds are likewise highly suitable. Candidates are in particular allyl alcohol, butenol, butenediol, itaconic acid, dilauryl phthalate, triallyl cyanurate, dilauryl ether, allylsulfosuccinic esters, allyl (meth)acrylate, of which in particular the low molecular weight representatives such as allyl alcohol, butenol and butenediol are preferred.

r6) Particular preference is given to glycol derivatives, in particular their higher molecular weight oligomers, since they generally perform a twofold function. Suitable representatives of this class are polyethylene glycol, polyethylene glycol monoalkyl ethers and bisalkyl ethers, polyethylene glycol monoalkyl ether sulfates or phosphates, polyethylene glycol monoaryl ethers, polyethylene glycol monoaryl ether sulfates or phosphates, in each of which part of the ethyleneoxy monomer may also be replaced by propylene- or butyleneoxy monomer. The alkyl groups are linear or branched, saturated or unsaturated $C_{10}$–$C_{20}$ radicals. Compounds of this type act not only as polymerization regulators but also as emulsifiers and in general are therefore included for just that reason alone. Skillful combination with other, non-regulating emulsifiers, eg. lauryl sulfate, makes possible a suitable regulating effect coupled with sufficient colloidal stability. Particularly preferred representatives of these polymerization regulators are neutralized fatty alcohol polyethylene oxide sulfates with $C_{12}$–$C_{18}$-alkyl radicals and from 2 to 60 mol of ethylene oxide (EO) or the nonsulfated representatives or else the alkylaryl polyethylene oxides or the corresponding sulfated variants with $C_6$–$C_{12}$-alkyl radicals and 2–60 mol of EO.

Similarly, glycol or diethylene glycol or else lower alkyl ethers thereof and also the cyclic derivatives such as dioxane can be added to the polymerization reaction. Low molecular weight monofunctional alcohols such as ethanol, n-propanol, isopropanol, n-butanol and isobutanol are likewise suitable for use as regulating substances. They are effective, on the one hand, as filming aids, but also for increasing the freeze-thaw stability, and are frequently added just for that reason alone.

r7) Aldehydes, such as acetaldehyde, propionaldehyde, benzaldehyde or preferably acrolein.

r8) Hypophosphorous acid and its salts, of which sodium hypophosphite is particularly preferred.

The (meth)acrylic ester copolymers or the vinyl ester copolymers are preferably prepared by the emulsion polymerization process. The polymerization can be carried out continuously or batchwise, with and without use of seed latices, with initial charging of all or individual constituents of the reaction mixture, or with partial initial charging and subsequent metered addition of the or individual constituents of the reaction mixture, or by the metering process without initial charge. Any metering is preferably at the rate of consumption of the respective component. The particle size of the polymer dispersions can be unitary (monomodal) or in the form of a broad distribution or a bi- or polymodal distribution. The polymer fraction is preferably from 30 to 70% by weight, particularly preferably from 40 to 68% by weight, very particularly preferably from 45 to 65% by weight, and for use can be thinned to a concentration suitable for the application process or adjusted to a certain processing viscosity using customary thickeners. the preparation of products for different uses. If thermoformable A very particularly preferred form of the polymerization process is a monomer emulsion feed in which the monomers may also be divided over two or more individual emulsions which differ in composition and which are fed to the polymerization reaction in sequential stages. The products are sequential addition polymers with a core-shell construction, for example. Addition polymers of this type are preferred, since the accumulation of the hydrophilic monomers in the shell will support the dispersing process of the later bonding agent. It was found that even a one-stage procedure will permit adequate dispersing of the addition polymers if a sufficient difference in the hydrophilicity is ensured in the choice of monomers A and B. If, however, a two-stage procedure is preferred for certain reasons, the stages can be carried out in succession or with overlap or else be added with overlapping gradients.

A particular form of the stagewise procedure involves the use of a seed to control the particle size. The polymer composition of the seed is freely choosable.

The dispersion can also be prepared in the form of a secondary dispersion. For this, the monomer mixture is solution-polymerized in a solvent such as hexane, toluene, n-butanol, glycol or tetrahydrofuran and subsequently dispersed in water.

Various applications perform better with harder variants having a more thermoplastic behavior. This can be achieved by changing the monomer combination or by means of a core-shell construction or by mixing different polymer dispersions. It is advantageous to admix the normal bonding agent dispersion with a second dispersion, a so-called "hard component". Preferably, the hard component is likewise constructed from monomers A and B to maximize compatibility. However, the hard component will differ in respect of the glass transition temperature, which is preferably at least 20° C. higher than that of the "soft" or matrix component. Owing to the fraction of hydrophilic monomers, the addition polymer of the hard component can likewise be redispersed during the recycling process. At any rate, however, complete redispersion of the harder component is not necessary. On the contrary, it is sufficient for the more easily filming matrix polymer to be dissolved. By adding filming aids to the hard component it is possible to influence its filmability in the mixture. The hard component and the soft component are mixed in a ratio of from 10:1 to 1:10, preferably from 4:1 to 1:4, particularly preferably from 2:1 to 1:2. The resulting bonding agent possesses excellent thermoplastic characteristics and is used for preparing hot-formable parts.

The dispersions are preferably prepared using anionic or nonionic emulsifiers or mixtures thereof. Particular preference is given to the commonly used, well known emulsifiers such as ethoxylated fatty alcohols or alkylphenols, their alkali metal or ammonium salts of sulfated, phosphated or sulfonated products; neutralized alkyl- or alkylarylsulfonates, sulfosuccinic esters of ethoxylated or nonethoxylated alcohols, sulfonated alkyldiphenyl oxides; alkyl (poly)glucosides, block copolymers having polyether or polyacrylic acid or polymethacrylic acid blocks as hydrophilic block, protective colloids or acid-containing graft copolymers. The emulsifier used is preferably an anionic emulsifier or a mix-ture of anionic and nonionic emulsifiers in total amounts of from 0.1 to 10, based on the total monomer mass. Protective colloids are preferably used in amounts of up to 40% by weight, based on monomer mass. Examples are vinyl alcoholvinyl acetate copolymers with a vinyl alcohol fraction of above 80%, polyvinylpyrrolidone, poly(alkyl methacrylate-b-polymethacrylic acid), cellulose ethers or starch. Emulsifiers or protective colloids can be optionally and selectively added to is initial charge, monomer emulsion or for poststabilization.

The addition polymers are obtained by free-radical polymerization. Water-soluble initiators such as alkali metal persulfates or ammonium persulfate or the corresponding perphosphates will be found highly suitable for preparing the addition polymers. It is also possible to use hydroperoxides such as hydrogen peroxide, tert-butyl hydroperoxide, cumene hydroperoxide and others. Preference is given to their use in redox initiator systems in the absence or presence of metal ions. Examples of reducing components in the redox systems are the alkali metal salts of hydroxymethinesulfinic acid, sodium bisulfite, sodium acetone bisulfite, sodium thiosulfate, ascorbic acid, isoascorbic acid, hydroxyacetone, 2-hydroxycyclopentanone, formamidinesulfinic acid, formic acid and sodium borohydride. Redox initiation performs particularly well in the presence of small amounts of metal salts readily capable of changing their valence, for example iron(II) sulfate, cerium(IV) nitrate or cobalt(II) sulfate.

The polymerization temperature can be between 5 and 95° C., depending on the initiation system chosen. These initiation systems may be used a further time at the end of the main polymerization, where at least 98% of the monomer has been converted, in order that the proportion of residual monomer may be reduced once more. Preferably, however, a system different from the primary initiation system is used for the aftertreatment. Generally, low residual monomer, i.e. below 100 ppm of total residual monomer, is obtained, the quoted figure also including the amount of residual acrylic acid or residual methacrylic acid if a redox initiator system comprising sodium acetone bisulfite as reductant is employed.

Owing to the chosen combination of hydrophilic and hydrophobic monomers and the polymerization in the presence of regulating polyether emulsifiers, the addition polymers of this invention exhibit pronounced electrolyte stability and can be sprayed through nozzles without leaving a residue.

Films formed by these dispersions are readily redissolvable in alkaline media after drying; Even if the addition polymers were used as bonding agents for consolidating nonwovens, an alkali treatment of the nonwoven after drying and use will dissolve the bonding agent and make it possible for the resulting fibrous mass to be filtered and recovered. The aqueous filtrate is preferably added to virgin bonding agent for liquor adjustment, but if necessary can be concentrated, neutralized or, after admixture with surfactant, frequently be redispersed. No difference was observed between filtrate-free and filtrate-containing bonding agent as regards web properties or its recycling characteristics.

The fact that the bonding agent is capable of completely dissolving in alkali also makes the addition of polymers suitable for use as yarn size or as papermaking binders. The addition polymers of this invention are further suitable for use as temporary or removable coating materials for wood, leather, textiles, plastics or metal.

(Suitable fibers)for the web include all fiber materials customary for nonwoven production. These include not only synthetic fibers such as viscose, polyester, polyamide, polypropylene, polyacrylonitrile, carbon fibers or fibers of homo- and copolymers of vinyl chloride or tetrafluoroethylene but also fibers of natural origin such as pulp, staple rayon, cellulose, cotton or wood fibers or else glass, ceramic or mineral fibers or mixtures thereof. Preferred fiber materials for disposables are PES or staple rayon or pulp fibers or PES-pulp fiber blends, while preferred fiber materials for needlefelts are mixtures of polyester and poly-propylene or polyamide fibers.

The fiber/binder mixing ratio can vary in accordance with the desired use within the range from 1:2 to 50:1 (by weight) and for most uses the fiber/binder ratio is within the range from 1:1 to 10:1.

The dispersions of this invention may additionally include additives such as plasticizers, defoamers, pH controllers, external crosslinkers such as melamine-formaldehyde or urea-formaldehyde resins, flame retard-ants, wetting agents, pigments, thickeners, lubricants, antifreezes, dyes, perfumes, etc., which are well known to the person skilled in the art, without loss of the characteristic properties.

The addition of hydrophobicizing agents can be used to further increase the already good wet strength of the uncrosslinked and hence dispersible addition polymers. The use of hydrophobicizing agents based on organofluorine compounds or silicone compounds in the bonding agent dispersion or in the bonded fiber web, i.e. on the surface of the fiber-bonder composite, offers resistance to the penetration of water and inhibits incipient dissolution or swelling of the bonding agent addition polymer. Of particular advantage are copolymerizable fluorinated monomers, which are used in the copolymerization, or copolymerizable silicone compounds, such as acrylatemodified silicones, for example the Tegomer grades® (Goldschmidt AG). Preference, however, is given to hydrophobicizing agents based on aqueous solutions of neutralized perfluorocarboxylic acids or aqueous dispersions of organofluorine polymers applied subsequently to the bonded fiber web, by liquor impregnation or spraying, and dried.

The fiber composite prepared by the described process can be used as material for disposables or as constituent of hygiene articles or textile articles.

The nonwoven is produced by the generally known processes of bath-impregnating, foam-impregnating, spraying, padding, foam-padding, knife-coating or printing the fiber web with the dispersion, for which the dispersion may be thinned with water or else thickened with customary thickeners in order that a certain processing viscosity may be set. The web treatment with the dispersion is generally followed by a drying and tempering with or without a hydrophobicization of the bonded fiber web obtained. The drying conditions depend on the type of dryer used, the drying temperature is customarily within the range from 100 to 230° C., and the drying/tempering is carried out within the range from a few seconds to several minutes.

The dispersion was subjected to the following test methods: The light transmissivity of the dispersion is measured at 25° C. on a concentration of 0.01% and a path length of 25 mm and constitutes a qualitative measure of the particle size. The particle sizes were measured in a Malvern auto-sizer, the solids content was determined gravimetrically, and residual monomer was determined in a gas chromatograph.

The surface tension was measured with a ring tensiometer of the type TELC from Lauda and the viscosity was determined in a Contraves rotary viscometer from Centronics, with DIN cup type III, at 250 s$^{-1}$ and 25° C. and is reported in mpa·s (DIN 53019). The molecular weights were determined by exclusion exclusion chromatography (GPC). The standards used were calibrated polystyrene reference compounds and the solvent used was tetrahydrofuran (THF). The reported figures are the molecular mass at the peak maximum (Mp) or the weight average molecular weight ($M_w$) in g/mol.

The bonded fiber webs were subjected to the following investigations:

a) Breaking Strength (BS) Dry and Wet 50 mm wide strips were cut out of the bonded fiber web nonwovens and subjected dry and water-wet with a free clamped length of 10 cm to a determination of the breaking strength by a strip tensile test on the lines of DIN 53 857. The results are reported in N per 50 mm. A good bonding agent confers a wet strength of more than 20 N/50 mm.

b) Bending Test (BT)

The bonded fiber web samples (70×30 mm) were bent around a metallic mandrel to determine the bending stiffness, used as a measure of softness. The bending stiffness is the force required for the bending and is reported in mN.

c) Hydrophibicity (Hy)

The nonwoven hydrophibicity was determined in accordance with ISO 811 and reported in cm water column.

d) Redispersion (RD)

The degree of redispersion is determined on nonwoven samples (0.3 g) stirred by means of a magnetic stirrer for 2 h at room temperature in a pH 11 sodium hydroxide solution containing 1% by weight of bis(2-ethylhexyl) sulfosuccinate or of an ethoxylated alkylphenols as wetting agent. Following collection by filtration and drying of the fibers, the loss of bonder was determined and reported in % of the original add-on. Weighing of the nonwoven and the fibers was preceded by 24 h of conditioning. Bonder loss above 50% is necessary for most requirements.

e) Testing the Dissolubility of the Dispersion or the Redispersion of the Dispersion Film (RDF)

0.5 g of dispersion is diluted with 30 ml of 1N sodium hydroxide solution and held at 50° C. for 3 h. Thereafter the appearance of the solution is visually assessed for transparency.

A sample of the dispersion was filmed at room temperature and left to dry in air for 2 days. A piece of film 1 cm$^2$ in size and about 0.5 mm in thickess was stirred for 2 h in 100 ml of 0.1N sodium hydroxide solution, and insoluble were filtered off and weighed. The aqueous solution was acidified with dilute hydrochloric acid and the solution was evaluated on attaining a pH of about 3.

The following emulsifiers were used:

Emulsifier 1: 30% strength aqueous solution of a neutralized, sulfated $C_{12}$–fatty alcohol ethoxylate (EO degree about 30)

Emulsifier 2: 20% strength aqueous solution of an ethoxylated tallow fatty alcohol (EO degree about 30)

Emulsifier 3: 40% strength solution of a mixture of neutralized $C_{12}$–$C_{14}$–alkylsulfonates Emulsifier 4: 35% strength aqueous solution of a neutralized, sulfated octylphenol ethoxylate (EO degree about 25)

Emulsifier 5: 28% strength solution of a neutralized, sulfated $C_{12}$–fatty alcohol ethoxylate (EO degree 3)

Percentages are by weight. The figures are based on total mass of monomer, unless otherwise stated.

The Examples which follow illustrate the invention.
1. Acid-rich addition polymers

EXAMPLE 1.1

A mixture of 600 g of water, 3 g of emulsifier 3 and 80 g of a monomer emulsion D1.1 was heated to 85° C. and admixed all at once with 60 g of a solution of 12 g of sodium peroxodisulfate in 370 g of water. The rest of the monomer emulsion is continuously added over 120 min, the rest of the initiator solution over 135 min, and the mixture is held at that tempterure for 120 min, cooled down to 30° C. and admixed with 0.2%, based on the monomer mass, of an aqueous solution of tert-butyl hydroperoxide and ascorbic acid. The product was a coagulum-free, approximately 50% strength by weight dispersion having a residual monomer content with a total of about 90 ppm.

The molecular mass Mp of the addition polymer was 160,000 g/mol (GPC).

Composition of D1.1

1170 g [78%]* of n-butyl acrylate
  450 g [7%] of acrylonitrile
  225 g [15%] of methacrylic acid
  2 g of sodium vinyl sulfonate, 25% strength aqueous solution
  15 g of emulsifier 3
  480 g of water

* The bracketed figures are based on the pure monomer composition.

The dispersion dissolves in sodium hydroxide solution to form a transparent solution (test e).

EXAMPLE 1.2

Example 1.1 is repeated with the inclusion in the monomer feed of 2-ethylhexyl thioglycolate as polymerization regulator. The molecular mass Mp of the addition polymer was 52,000 g/mol (GPC).

EXAMPLE 1.3

Example 1.1 is repeated with 16.7% of acrylic acid instead of methacrylic acid.

EXAMPLE 1.4

Example 1.1 is repeated with the feed stream additionally including 75 g of emulsifier 2.

EXAMPLE 1.5

A mixture of 600 g of water and 45 g of monomer emulsion D1.5 was heated to 85° C. and admixed all at once with 15 g of a solution of 7.5 g of sodium peroxodisulfate in 290 g of water. After 15 min the rest of monomer emulsion D 1.5 was added over 120 min and the rest of the initiator solution over 135 min and the reaction mixture was held at that temperature for a further 60 min. After cooling down to room temperature, the reaction mixture is in each case admixed with 0.2%, based on the monomer mass, of an aqueous solution of t-butyl hydroperoxide and isoascorbic acid. The product obtained was a coagulum-free, approximately 50% strength by weight dispersion containing about 60 ppm of residual acrylic ester monomer.

Composition of D1.5

900 g [60%]    of n-butyl acrylate
  450 g [30%]   of methyl acrylate
  150 g [15%]   of methacrylic acid
  75 g           of emulsifier 1
  37.5 g         of emulsifier 2
  530 g          of water

EXAMPLE 1.6

Example 1.5 is repeated in each case with the additional inclusion in the monomer feed of 0.7% by weight of 2-ethylhexyl thioglycolate as polymerization regulator.

The results of the above-described runs are summarized below in Table 1.

TABLE 1

| Ex. | Proportion of regulator | Solids % | pH | LT % | PS nm | Visc. mPas | Surf. ten. mN/m | Solubility | RM ppm |
|---|---|---|---|---|---|---|---|---|---|
| 1.1 | 0 | 49.6 | 2.6 | 77 | 170 | 43 | 28 | clear | 90 |
| 1.2 | 0.7 | 49.9 | 2.6 | 75 | 180 | 38 | 21 | clear | 80 |
| 1.3 | 0 | 39.0 | 2.4 | 78 | 205 | 15 | 38 | slightly cloudy | 90 |
| 1.4 | 0 | 49.5 | 2.3 | 69 | 195 | 20 | 38 | clear | 170 |
| 1.5 | 0 | 49.8 | 2.1 | 66 | 215 | 24 | 42 | clear | 60 |
| 1.6 | 0.7 | 50.1 | 2.1 | 67 | 220 | 23 | 38 | clear | 80 |

2. SPECIFIC SYSTEMS

EXAMPLE 2.1

A dispersion with a monomer composition of 50% of n-butyl acrylate, 48% of methyl acrylate and 2% of acrylic acid was prepared on the lines of the method of Example 1.5, adjusted with sodium hydroxide solution to pH=4.3 and used for impregnating fiber web materials.

EXAMPLE 2.2

A dispersion with a monomer composition of 60% of n-butyl acrylate, 38% of vinyl acetate and 2% of acrylic acid was prepared on the lines of the method of Example 1.5 and adjusted with sodium hydroxide solution to pH=4.3. The molecular mass Mp of the addition polymer was 96,000 g/mol (GPC).

EXAMPLE 2.3

A dispersion with a monomer composition of 83% of ethyl acryis late, 15% of n-butyl acrylate and 2% of acrylic acid was prepared on the lines of the method of Example 1.5 and adjusted with sodium hydroxide solution to pH=4.3.

EXAMPLE 2.4

A dispersion with a monomer composition of 58% of n-butyl acrylate, 40% of vinyl propionate and 2% of acrylic acid was prepared on the lines of the method of Example 1.5.

EXAMPLES 2.5, 2.7 and 2.8

Examples 2.1, 2.3 and 2.4 were repeated in the presence of 0.7%, based on monomer, of the regulator 2-ethylhexyl thioglycolate.

EXAMPLE 2.6

Example 2.2 was repeated in the presence of 0.7%, based on monomer, of the regulator 2-ethylhexyl thioglycolate. The molecular mass Mp of the addition polymer was 46,000 g/mol (GPC).

EXAMPLE 2.9

Example 1.5 is repeated using monomer emulsion D2.9. Following complete monomer addition, the reaction mixture is held at the polymerization temperature (90° C.) for a further 60 min, cooled down and admixed with 0.3% of tert-butyl hydroperoxide. A solution of 4 g of sodium disulfite in 30 g of water and 5 g of acetone is metered into the stirred mixture over 30 min. The product obtained is a coagulum-free dispersion having a pH of 2.1 and a residual monomer content of 70 ppm.

Composition of D2.9

| | |
|---|---|
| 660 g [44%] | of n-butyl acrylate |
| 450 g [30%] | of ethyl acrylate |
| 150 g [10%] | of styrene |
| 225 g [15%] | of methacrylic acid |
| 15 g [1%] | of acrylamidoglycolic acid |
| 7 g | of tert-dodecyl mercaptan |
| 65 g | of emulsifier 4 |
| 75 g | of emulsifier 2 |
| 480 g | of water |

EXAMPLE 2.10

A mixture of 670 g of water, 2.1 g of emulsifier 3, 0.9 g of sodium vinylsulfonate and 22 g of a monomer emulsion A was heated to 85° C. and admixed with 6.0 g of sodium persulfate. After 15 min the rest of monomer emulsion A is added over 60 min and 4.8 g of sodium persulfate are added over 70 min as a 4.6% strength by weight solution. Thereafter, at 60° C., ammonia is added to adjust the reaction mixture to pH 5, followed by monomer emulsion B over 60 min and a reductant solution, comprising 2.4 g of ascorbic acid and 20 mg of iron(II) sulfate in 100 g of water, over 75 min. After cooling, the mixture is aftertreated with 0.2%, based on monomers, of tert-butyl hydroperoxide and ascorbic acid. The product obtained was a coagulum-free dispersion having a pH of 3.3 and a volatile residual monomer content of 50 ppm.

Composition of Monomer Emulsion A:

| | |
|---|---|
| 396 g [33%] | of n-butyl acrylate |
| 84 g [7%] | of acrylonitrile |
| 120 g [10%] | of methacrylic acid |
| 9 g | of emulsifier 3 |
| 0.2 g | of sodium vinylsulfonate |
| 18 g | of 2-ethylhexyl thioglycolate |
| 485 g | of water |

Composition of Monomer Emulsion B:

| | |
|---|---|
| 36 g [30%] | of methacrylic anhydride |
| 180 g [15%] | of n-butyl acrylate |
| 60 g [5%] | of methacrylic acid |
| 9 g | of emulsifier 3 |
| 0.2 g | of sodium vinylsulfonate |
| 460 g | of water |

EXAMPLE 2.11

Example 1.5 is repeated using monomer emulsion D2.11. Following addition of all the monomer, the reaction mixture is maintained at the polymerization temperature (82° C.) for a further 60 min and in each case 0.1% of tert-butyl hydroperoxide and 0.1% of a solution of sodium hydroxymethylsulfinic acid are metered in. The product obtained is a coagulum-free dispersion having a pH of 2.6 and a residual monomer content of 90 ppm. The molecular mass Mp of the addition polymer was 115,000 g/mol (GPC).

Composition of D2.11:

| | |
|---|---|
| 660 g [75%] | of n-butyl acrylate |
| 45 g [3%] | of hydroxyethyl acrylate |
| 105 g [7%] | of acrylonitrile |
| 225 g [15%] | of methacrylic acid |
| 5 g | of tert-dodecyl mercaptan |
| 90 g | of emulsifier 4 |
| 820 g | of water |

COMPARATIVE EXAMPLE 2.12

A mixture of 600 g of water, 3.5 g of hydrogen peroxide and 45 g of monomer emulsion D2.12 was heated to 60° C. and admixed with 10 g of a solution of 3 g of ascorbic acid and 20 mg of iron(II) sulfate in 200 g of water. Thereafter the rest of the monomer emulsion was added continuously over 120 min and the rest of the reduction solution over 135 min. On completion of the addition the reaction mixture was held at that temperature for a further 90 min, cooled down and admixed in each case with 0.2%, based on monomer mass, of an aqueous solution of tert-butyl hydroperoxide and ascorbic acid.

Composition of D2.12:

| | |
|---|---|
| 1500 g [94%] | of ethyl acrylate |
| 63.6 g [4%] | of acrylamidoglycolic acid |
| 31.8 g [2%] | of acrylic acid |
| 80 g | of emulsifier 1 |
| 40 g | of emulsifier 2 |
| 520 g | of water |

COMPARATIVE EXAMPLE 2.13

Example 1.5 is repeated with a mixture of 530 g of water and 17 g of a solution of sodium persulfate in 110 g of water having admixed with it at 85° C. monomer emulsion D2.13 over 120 min and the rest of the initiator solution over 135 min. After a further hour an aftertreatment is carried out with in each case 0.1% of tert-butyl hydroperoxide and sodium hydroxymethylsulfinic acid. The product obtained was a coagulum-free, 50% strength by weight dispersion having a residual monomer content of 40 ppm.

Composition of D2.13

| | |
|---|---|
| 1380 g [92%] | of n-butyl acrylate |
| 45 g [3%] | of acrylonitrile |
| 300 g [3%] | of N-(hydroxymethyl)methacrylamide, 15% strength solution |
| 30 g | of acrylic acid |
| 90 g | of emulsifier 4 |
| 560 g | of water |

COMPARATIVE EXAMPLE 2.14

Example 1.1 is repeated. On completion, 22% of the copolymerized acid groups are neutralized with calcium hydroxide.

Table 2 below summarizes the compositions and the dispersion data of Examples 2.1–2.13.

TABLE 2

| Ex. | BA | EA | MA | VAc | VPr | S | HEA | AN | AS | AAG | MAS | MAMol | MASA |
|---|---|---|---|---|---|---|---|---|---|---|---|---|---|
| 2.1 | 50 | | 48 | | | | | | 2 | | | | |
| 2.2 | 60 | | | 38 | | | | | 2 | | | | |
| 2.3 | 15 | 83 | | | | | | | 2 | | | | |
| 2.4 | 58 | | | | 40 | | | | 2 | | | | |
| 2.5 | 50 | | 48 | | | | | | 2 | | | | |
| 2.6 | 60 | | | 38 | | | | | 2 | | | | |
| 2.7 | 15 | 83 | | | | | | | 2 | | | | |
| 2.8 | 58 | | | | 40 | | | | 2 | | | | |
| 2.9 | 44 | 30 | | | | 10 | | | | 1 | 15 | | |
| 2.10 | 48 | | | | | | | 7 | | | 15 | | 30 |
| 2.11 | 75 | | | | | 3 | | 7 | | | 15 | | |
| C2.12 | | 94 | | | | | | | 2 | 4 | | | |
| C2.13 | 92 | | | | | | | 3 | 2 | | | 3 | |
| C2.14 | 78 | | | | | | 7 | | | | 15 | | |

| Ex. | Regulator | Solids % | pH | LT % | PS nm | Visc. mPas | Surf. ten. mN/m | Solubility | RM ppm |
|---|---|---|---|---|---|---|---|---|---|
| 2.1 | — | 49.7 | 4.3 | 49 | 270 | 12 | 40 | slightly cloudy | 40 |
| 2.2 | — | 49.3 | 4.6 | 62 | 250 | 13 | 38 | slightly cloudy | 900 |
| 2.3 | — | 49.6 | 6.0 | 61 | 240 | 15 | 39 | very cloudy | 20 |
| 2.4 | — | 49.6 | 2.1 | 64 | 210 | 21 | 43 | cloudy | 180 |
| 2.5 | 0.7 | 49.9 | 2.1 | 69 | 200 | 22 | 43 | clear | 40 |
| 2.6 | 0.7 | 49.2 | 2.1 | 65 | 230 | 13 | 36 | clear | 1000 |
| 2.7 | 0.7 | 50.0 | 2.1 | 47 | 315 | 12 | 37 | clear | 30 |
| 2.8 | 0.7 | 49.2 | 2.3 | 62 | 240 | 21 | 40 | clear | 60 |
| 2.9 | 0.5 | 49.0 | 2.1 | 45 | 300 | | | slightly cloudy | 70 |
| 2.10 | 1.5 | 40.0 | 2.2 | 69 | | | | clear | 50 |
| 2.11 | 0.3 | 49.4 | 2.6 | 77 | 184 | | | | 90 |
| C2.12 | — | 52.3 | 2.1 | 59 | 220 | 35 | 40 | very cloudy | 10 |
| C2.13 | — | 49.7 | 2.4 | 73 | 196 | | | cloudy | 40 |
| C2.14 | — | 49.5 | 5.5 | 75 | 170 | 37 | 35 | slightly cloudy | 120 |

3. PREPARATION OF BONDED FIBER WEB NONWOVENS AND TESTING

EXAMPLE 3

A longitudinally laid (fiber orientation preferentially in one direction, the longitudinal direction) fiber web comprising a mixture of polyester and pulp fibers (mixing ratio 20:80) and having a basis weight of 41 g/m$^2$ was saturated in independent experiments with the dispersions of the recited examples and comparative examples, which had first been diluted beforehand to a uniform solids content of 25%, passed between two counterrotating rolls to remove excess dispersion, and thereafter exposed to a temperature of 150° C. for 2 min. The fiber:bonder ratio was 3:1 in all cases. Where hydrophobicized, the samples were hydrophobicized with Persistol O® (cationic solution of a fluorocarbon compound, BASF) and dried at 150° C. for 2 min.

50 mm wide test strips were cut from the nonwovens and tested according to method a)–d). The results obtained are set down below in Table 3.

TABLE 3

| Ex. | Hydrophobicized | Breaking strength, dry N/50 mm | Breaking strength, wet N/50 mm | Bending test mN | Hydrophobicity cm of water colum | Redispersion % |
|---|---|---|---|---|---|---|
| 1.1 | no | 146 | 21 | 116 | 18 | 93 |
| 1.1 | yes | 144 | 30 | 103 | 22 | 91 |
| 1.2 | yes | 112 | 11 | 101 | 21 | 96 |
| 1.3 | yes | 117 | 17 | 83 | 24 | 50 |
| 1.3 | yes | 135 | 31 | 103 | 28 | 91 |
| 1.5 | yes | 72 | 25 | 89 | 25 | 78 |
| 1.5 | no | 70 | 9 | 98 | 21 | 82 |

TABLE 3-continued

| Ex. | Hydrophobicized | Breaking strength, dry N/50 mm | Breaking strength, wet N/50 mm | Bending test mN | Hydrophobicity cm of water colum | Redispersion % |
|---|---|---|---|---|---|---|
| 1.6 | yes | 66 | 7 | 62 | 21 | 100 |
| 2.1 | yes | 70 | 27 | 86 | 24 | 22 |
| 2.2 | yes | 69 | 20 | 95 | 21 | 28 |
| 2.3 | yes | 56 | 24 | 76 | 21 | 40 |
| 2.4 | yes | 46 | 21 | 66 | 24 | 17 |
| NH 2.1 | no | 61 | 10 | 79 | 12 | 35 |
| NH 2.2 | no | 66 | 8 | 77 | 6 | 31 |
| NH 2.3 | no | 49 | 8 | 72 | 6 | 32 |
| NH 2.4 | no | 42 | 11 | 59 | 18 | 43 |
| 2.5 | yes | 28 | 6 | 32 | 19 | 100 |
| 2.6 | yes | 34 | 4 | 39 | 20 | 92 |
| 2.7 | yes | 21 | 4 | 27 | 16 | 91 |
| 2.8 | yes | 21 | 5 | 33 | 15 | 84 |
| 2.9 | yes | 133 | 57 | 116 | 25 | 96 |
| 2.10 | yes | 117 | 17 | 83 | 24 | 50 |
| 2.11 | yes | 133 | 32 | 99 | 24 | 98 |
| C2.12 | yes | 107 | 76 | 91 | 25 | 6 |
| C2.13 | yes | 100 | 78 | 95 | 26 | 2 |
| C2.14 | yes | 154 | 5 | 141 | 20 | 91 |

Comparative Examples C2.12 and C2.13, featuring a high proportion of crosslinking monomers, illustrate the poor redispersion of the bonding agent when the wet breaking strength and hydrophobicity are high. C2.14 illustrates the unacceptable deterioration in the wet strength following partial neutralization with calcium hydroxide, as known from the prior art.

Experiments NH-2.1 to NH-2.4 illustrate the polymer dispersions with the compositions according to this invention are suitable for conferring moderate redispersibility on nonwovens. However, such samples exhibit insufficient wet strength and a high hydrophobicity. The use of hydrophobicizing agents (experiments 2.1–2.4) increases the wet breaking strength and hydrophobicity, but does not improve the redispersibility. Reducing the molecular weight increases the redispersibility.

Experiments 2.9–2.11 illustrate the increase in the wet breaking strength as a result of raising the proportion of hydrophilic monomers, the reduction in the hydrophilicity as a result of adding hydrophobicizing agents, and the improvement in the redispersibility as a result of using regulating substances in the polymerization.

EXAMPLE 3.2

Example 3.1 is repeated using the product of Example 1.1. The bonded fiber web is subjected to the dispersing test (test d) and the fibers are filtered off and re-used for web making. 230 parts by weight of the aqueous filtrate are used to dilute 100 parts by weight of the fresh dispersion of Example 1.1 to obtain a liquor having a solids content of 15% by weight and a pH of about 3.5. This liquor is used to prepare further bonded fiber web nonwovens for testing. They are found to have a dry breaking strength of 125 N/5 cm, a wet strength of 25 N/5 cm and a unchanged dispersibility. The example illustrates that, after dissolution out of bonded fiber web waste, the bonding agent too can be recycled into the production process. The use of recyclate dispersion accordingly also makes possible 100% utilization of the bonding agent used.

EXAMPLE 4

A mixture of 250 g of water and 5.3 g of emulsifier 5 is heated to 80° C., 17 g of a solution of 9.6 g of sodium persulfate in 75 g of water are added, and monomer emulsion D4 is added over 120 min and the rest of the initiator solution over 200 min. On completion of the addition the reaction mixture is postpolymerized for 1 h. The product obtained is a coagulum-free, 50% strength by weight dispersion having an average particle size of 175 nm and a pH of 2.5. The proportion of volatile residual monomers is about 90 ppm in total. The glass transition temperature of the addition polymer is $-2°$ C., the molecular weight (Mw) was 47,000 (GPC), and the polydispersity was 7.0.

Composition of D4:

| 240 g [40%] | of n-butyl acrylate |
| 273 g [45.5%] | of ethyl acrylate |
| 87 g [14.5%] | of methacrylic acid |
| 6 g | of tert-dodecyl mercaptan |
| 7 g | of sodium hydroxide solution, 25% strength |
| 30 g | of emulsifier 5 |
| 270 g | of water |

EXAMPLE 5.1

Example 4 was repeated using monomer emulsion D5.1 and 0.6 %, based on monomer mass, of sodium persulfate, affording a coagulum-free 50% strength by weight dispersion having an average particle size of 145 nm and a pH of 5.1. The proportion of volatile residual monomers is about 210 ppm in total. The glass transition temperature of the addition polymer was $+101°$ C., the molecular weight (Mw) was 25,000 (GPC), and the polydispersity was 3.4.

Composition of D5.1:

| | | |
|---|---|---|
| 358 g [55%] | of methyl methacrylate | |
| 65 g [10%] | of n-butyl acrylate | |
| 130 g [20%] | of styrene | |
| 98 g [15%] | of methacrylic acid | |
| 9 g | of tert-dodecyl mercaptan | |
| 8 g | of sodium hydroxide solution, 25% strength | |
| 46 g | of emulsifier 5 | |
| 320 g | of water | |

EXAMPLE 5.2

Example 4 was repeated using 0.1% of t-DMK and 0.6% of emulsifier 3 and 1.0%, based on monomer mass, of sodium persulfate to prepare a dispersion having a polymer composition of 98% of styrene, 1% of acrylic acid and 1% of methacrylamide. After 1 h postpolymerization, a treatment was carried out with in each case 0.2% of tert-butyl hydroperoxide and 0.1% of sodium hydroxymethylsulfinate. The product obtained was a coagulum-free, 56% strength by weight dispersion having an average particle size of 150 nm and a pH of 2.1. The glass transition temperature of the addition polymer was +101° C.

EXAMPLE 5.3

The dispersions of Examples 4, 5.1 and 5.2 were filmed at room temperature, dried at room temperature for 3 days and tempered at 140° C. for 30 min. The dispersions and films were solubility tested by storing at 50° C. in dilute ammonia solution (25% strength by weight) at pH 11.

| Dispersion | Ratio | Type | Solubility |
|---|---|---|---|
| Example 4 | 100% | Dispersion | completely |
| | 100% | Film | completely |
| Example 5.1 | 100% | Dispersion | completely |
| | 100% | Film | completely |
| Example 5.2 | 100% | Dispersion | not |
| | 100% | Film | not |
| Mixture of Example 4 + Example 5.1 | 40:60 | Dispersion | completely |
| | 40:60 | Film | completely |
| Mixture of Example 4 + Example 5.2 | 40:60 | Dispersion | not completely |
| | 40:60 | Film | not completely |

EXAMPLE 5.4

The dispersion of Example 4 is dissolved in 25% strength by weight ammonia solution to prepare a 10% strength by weight polymer solution (pH about 10.5). A solution of sodium lauryl sulfate (NaLS) is added with stirring and at 95° C. 5% strength by weight hydrochloric acid is slowly added to lower the pH down to pH 3. The pH change converts the isotropic solution into a dispersion whose particle size was measured by light scattering after cooling and stirring for 1 h.

| | Proportion of NaLS in % | |
|---|---|---|
| Experiment | based on polymer | Particle size |
| a | 0.1 | 92 nm |
| b | 0.5 | 43 nm |
| c | 1.0 | 29 nm |

EXAMPLE 6

A mixture of the dispersions of Example 4 and Example 5.1 (40:60) is adjusted to pH 8 with sodium hydroxide solution and subsequently raised to a viscosity of about 7000 mPas with polyacrylic acid thickener (Latekoll® D–BASF). A 34×24 cm segment of an unbonded polypropyis lene web is padded from the back with the thickened dispersion to a solids add-on of about 60%. The padded web is then dried to constant weight at 120° C. in a drying cabinet and two rectangular segments (24×8 cm) are prepared so that their long sides extend in the machine direction of the web. The samples are stored for 20 h in a conditioning chamber.
Determination of Dimensionsal Stability:

A segment is heated in a frame under an IR radiator bank (5×400 W. distance from IR to segment: 22 cm) from the back for 130 sec and then immediately extended by 20% while preventing any narrowing perpendicular to the direction of extension. The force required for the extension is recorded during the process of extension. The extended web is cooled and, while in the extended state, a rectangular specimen is punched out and immediately measured lengthwise. The specimens are heated for 5 h in a drying cabinet at 90° C., and their decrease in length is measured after cooling down to room temperature and used to calculate the percentage shortening.
Results:

Deformation force 52 N, dimensional stability 2.4%. The same test found an average of 65 N and 2.8%, respectively, for a customary binder for formable needlefelt floorcovering. The comparative dispersion used is Styrofan DS 4020 (BASF AG), which is sold as a bonding agent for manufacturing thermoformable floor coverings.
Deformation:

A 21×21 cm segment is clamped into a special device, heated from the back for 90 sec under an IR radiator bank (3×400 W, distance from IR to segment: 15 cm), deformed (mold dimensions about 8.5×8.5×3.5 cm) is assessed qualitatively: accuracy of fit is good and there are no side cracks.

EXAMPLE 7

A mixture of the dispersions of Example 4 and Example 5.1 (40:60) is adjusted with sodium hydroxide solution to pH 8 and diluted to a liquor concentration of 25%. A segment of unbonded polypropylene web is weighed out and placed in the liquor, and the wet web is squeezed off between two rolls to a weight increase of about 100%. Drying takes place in a fresh air drying cabinet at 120° C. to constant weight. The target figure is a bonding agent uptake of about 25%. After conditioning (20 h conditioning chamber), the needlefelt floor-covering is tested for stiffness: at least 2 samples of a size of 20×10 cm in the longitudinal direction are placed face up in a bending device. The specimen is pulled upward by means of a stirrup at a speed of 150 mm/min. The maximum force if recorded in N.
Result:

Maximum force =6.0 N. The same test found 12.5 N on average for a customary bonder for formable needlefelt floorcovering, ie. a distinctly stiffer product.

8. SEPARATION OF BONDING AGENT FROM BONDED FIBER WEB

EXAMPLE 8

Samples of the back-coated carpet of Example 6 (sample A), 7 (sample B) and sample C (similarly to Example 7) are each stirred at 50° C. for 2 h in (ammonia solution)(25% by weight, pH 10), the mixture is cooled down, and the insoluble fiber pulp is filtered off. The filtered-off fibers are used for preparing new needlefelt. The testing is repeated four times and the loss of bonder determined. The loss of bonder in cases A and B is virtually quantitative, while in case C about 60% of the bonding agent are removed. The hard phase separates from the dry fiber pulp as a dust.

| | Mixture | Ratio of hard phase to soft phase | Bonder loss through dispersion in % | Mean |
|---|---|---|---|---|
| A | Ex. 5.1 + Ex. 4 (Ex. 6) | 60:40 | 91.0 | 91% |
| B | Ex. 5.1 + Ex. 4 (Ex. 7) | 60:40 | 94, 103, 100, 96 | 98% |
| C | Ex. 5.2 + Ex. 4 (Ex. 7) | 60:40 | 50, 62, 57, 59 | 57% |
| D | Comparative dispersion | 100 | <5 | <5% |

The testing shows that complete separation of the bonding agent is achieved where a readily soluble hard phase and a readily soluble soft phase are used. Even if the hard phase is insoluble of itself, it is nonetheless the case that some of the hard phase will dissolve out in a mixture together with a minor amount of a soluble soft phase. The remaining hard phase adhering to the fibers is readily detachable by mechanical treatment.

9. REDISPERSION OF REMOVED BONDING AGENT

EXAMPLE 9

The filtrates of Example 8 (liquor concentration about 5%) are admixed with 0.1% of sodium lauryl sulfate, heated to 95° C. and acidified to pH 3.5 with 5% strength by weight hydrochloric acid with stirring. The particle sizes of the dispersions are determined by light scattering.

| | Mixture | Ratio of hard phase to soft phase | Particle size of resulting dispersions in nm |
|---|---|---|---|
| A | Ex. 5.1 + Ex. 4 (Ex. 6) | 60:40 | 81 |
| B | Ex. 5.1 + Ex. 4 (Ex. 7) | 60:40 | 82 |
| C | Ex. 5.2 + Ex. 4 (Ex. 7) | 60:40 | 245 |

The completely dissoluble bonding agent (cases A and B) redisperses to form a finely divided dispersion, while the insoluble hard phase fractions nonetheless partly removed in Example 8 represent the dominating particles in the light scattering in case C.

10. RECYCLING OF REDISPERSED BONDING AGENT: BLENDING WITH FRESH DISPERSION

EXAMPLE 10

Dispersions B and C of Example 9 were added to fresh bonding agent, a mixture of hard and soft component in a ratio of 60:40. The re-cycled fraction indicates the fraction of recycled polymer to total polymer (=recyclate+fresh bonding agent). This mixture is used similarly to Example 7 to prepare a new bonded fiber web in each case. The recyclability thereof is tested similarly to Example 8 on 6 samples.

| | Bonding agent | Recycled fraction | Bonder loss due to dispersion in % | Mean |
|---|---|---|---|---|
| E | Ex. 7 + Ex. 6, 60:40 | 0.2 | 102, 101, 96, 103, 98, 102 | 100% |
| F | Ex. 8 + Ex. 6, 60:40 | 0.25 | 66, 46, 72, 58, 72, 64 | 63% |

The filtrates of Experiments E and F are acidified similarly to Example 8. The pH 3.5 solutions form dispersions whose particle size hardly differs from those of Example 9.

11. RECYCLING OF REDISPERSED BONDING AGENT: USED CONCENTRATED AND PURE AS BONDING AGENT

EXAMPLE 11

Dispersion A of Example 9 is concentrated to 31.5% with the aid of a rotary evaporator. An unbonded polypropylene web is finished with this dispersion similarly to Example 6 and the thermoplastic properties are redetermined.

| | Example 11 | Example 16 | Comparative dispersion |
|---|---|---|---|
| Deformation force, N | 52 | 48 | 65 ± 22 |
| Dimensional stability, % | 2.4 | 2.6 | 2.8 ± 0.6 |

We claim:
1. A method of recycling fibers and fiber bonding agent, comprising:
   a) preparing a bonding agent comprising an aqueous addition polymer dispersion having an addition polymer fraction which films at the temperature the aqueous dispersion is employed as a bonding agent, wherein the polymer contains acidic or basic functional groups which confer water-solubility to the polymer upon pH adjustment to either an acidic or basic aqueous medium;
   b) mixing fibers with the dispersion, thereby obtaining a fibrous composite product bound with the polymeric bonding agent of step a);
   c) subsequently, placing a quantity of the bonded fibrous material of step (b) in an aqueous solution adjusted to a pH which dissolves the polymer bonding agent of the fiber; and
   d) separating the polymer bonding agent free fibers from the bonding agent solubilized in the aqueous medium, thereby permitting reuse of the fibers independently in the preparation of another bonded fibrous composite material and the reuse of the polymer bonding agent by adjusting the aqueous solution to a pH at which the polymer exists as a dispersion in an aqueous medium, thereby placing the polymer in a redispersed form as a bonding agent for mixing with fibers to form another bonded fibrous composite material.

2. The process as claimed in claim 1, wherein the dispersion of the redispersed bonding agent is reused for preparing fiber composites.

3. The process as claimed in claim 1, wherein the dispersion of the redispersed bonding agent is mixed with fresh bonding agent dispersion for the manufacture of fiber composites.

4. The process as claimed in claim 1, wherein the aqueous bonding agent solution produced is employed as a protective colloid solution in the preparation of an aqueous addition polymer dispersion.

5. The process as claimed in claim 1, wherein the solution of an addition polymer containing basic groups is adjusted to a pH>8 thereby forming a dispersion.

6. The process of claim 5, wherein said pH is adjusted to >9 thereby forming a dispersion.

7. The process as claimed in claim 1, wherein the pH is adjusted by adding an aqueous solution of ammonia or an alkali metal hydroxide, carbonate or bicarbonate to said aqueous bonding agent solution.

8. A method of preparing recyclable fibrous composites, comprising:
   a) preparing a bonding agent comprising an aqueous addition polymer dispersion having an addition polymer fraction which films at the temperature the aqueous dispersion is employed as a bonding agent, wherein the polymeric bonding agent contains acidic or basic functional groups which confer water-solubility to the polymer bonding agent upon pH adjustment to either an acidic or basic aqueous medium; and
   b) mixing fibers with the aqueous dispersion, thereby obtaining a fibrous composite product bound with the polymeric bonding agent of step (a).

9. The process as claimed in claim 8 wherein said addition polymer has protic acid groups and wherein, when an aqueous dispersion of the addition polymer is increased in pH, the dispersion is converted into an aqueous solution of the addition polymer.

10. The process as claimed in claim 8, wherein said aqueous addition polymer has basic groups and wherein, when an aqueous dispersion of the addition polymer is decreased in pH, the dispersion is converted into an aqueous solution of the addition polymer.

11. The process as claimed in claim 10, wherein said basic groups are amino groups.

12. The process as claimed in claim 8, wherein said addition polymer is prepared by free-radically polymerizing:
   a) from 50–99% by weight of at least one monomer A selected from the group consisting of (meth)acrylic esters, vinyl esters, aromatic vinyl compounds, vinyl ethers, ethylenically unsaturated nitriles and olefinic hydrocarbons; and
   b) from 1–50% by weight of at least one water-soluble monomer B selected from the group consisting of ethylenically unsaturated carboxylic acids, organic ethylenically unsaturated sulfonic acids, organic ethylenically saturated carboxamides, Nmethylol compounds of ethylenically unsaturated carboxamides and hydroxy alkyl(meth)acrylates, wherein the film forming addition polymer is prepared in the presence of from 0.01–10% by weight, based on A+B, of a substance which regulates the free radical polymerization reaction.

13. The process as claimed in claim 8, wherein the aqueous addition polymer dispersion is prepared by free radically polymerizing monomers in an aqueous emulsion.

14. The process as claimed in claim 8, wherein the addition polymer of the aqueous addition polymer dispersion is present in an amount of from 30–70% by weight, based on the weight of the aqueous addition polymer dispersion.

15. The process as claimed in claim 14, wherein said addition polymer is present in an amount of from 45–65% by weight, based on the weight of the aqueous addition polymer dispersion.

16. The process as claimed in claim 8, wherein the addition polymer has a glass transition temperature ranging from −50 to 60° C.

17. The process as claimed in claim 16, wherein said glass transition temperature ranges from −40 to +30° C.

18. The process as claimed in claim 8, wherein the addition polymer contains from 0.01–10% by weight of acrylamidoglycolic acid as copolymerized units.

19. The process as claimed in claim 8, wherein the aqueous addition polymer dispersion further comprises a non-film forming addition polymer in addition to said addition polymer.

20. The process as claimed in claim 19, wherein said non-film forming addition polymer has a glass transition temperature of from >60° C. to 150° C.

21. The process as claimed in claim 8, wherein the fiber composites are treated with a silicone or a fluorine containing compound as a hydrophobicizing agent.

22. A recyclable fibrous composite material prepared by the process of claim 8.

23. A method of recycling fibrous composites, comprising:
   a) placing the bonded fibrous composite of claim 8 in an aqueous medium having a pH which solubilizes the polymer bonding agent of the fibrous composite, thereby removing the polymer bonding agent from the fibers;
   b) separating the fibers from the bonding agent containing solution; and
   c) independently recycling the fibers for the preparation of another bonded fibrous composite material and the aqueous solution for bonding with fibers when the pH of the bonding agent containing solution is adjusted to a pH at which a polymer dispersion forms.

24. A method of recycling fibrous composites, comprising:
   a) placing the bonded fibrous composites of claim 8 in an aqueous medium having a pH which solubilizes the polymer bonding agent of the fibrous composite, thereby removing the polymer bonding agent from the fibers;
   b) separating the fibers from the bonding agent containing solution; and
   c) independently recycling the fibers for the preparation of another bonded fibrous composite material.

* * * * *